(12) United States Patent
Mishra et al.

(10) Patent No.: US 12,014,298 B2
(45) Date of Patent: Jun. 18, 2024

(54) AUTOMATICALLY SCHEDULING AND ROUTE PLANNING FOR SERVICE PROVIDERS

(71) Applicant: Walmart Apollo, LLC, Bentonville, AR (US)

(72) Inventors: Abhishek Mishra, Bengaluru (IN);
Sunil Kumar Potnuru, Bengaluru (IN);
Nimish Kumar, Bangalore (IN);
Paulami Chaudhuri, Bangalore (IN);
Ashish Gupta, Bangalore (IN); Noyle Christopher, Bentonville, AR (US);
Lauren Jean Shores, Springfield, IL (US); Rahul Verma, Bangalore (IN);
Hema Vaishanav, Bengaluru (IN);
Abhishek Ray Chaudhury, Bangalore (IN); Himanshu Singh, Kanpur (IN)

(73) Assignee: WALMART APOLLO, LLC, Bentonville, AR (US)

( * ) Notice: Subject to any disclaimer, the term of this patent is extended or adjusted under 35 U.S.C. 154(b) by 6 days.

(21) Appl. No.: 17/564,934

(22) Filed: Dec. 29, 2021

(65) Prior Publication Data
US 2022/0383230 A1    Dec. 1, 2022

Related U.S. Application Data

(60) Provisional application No. 63/194,587, filed on May 28, 2021.

(51) Int. Cl.
*G06Q 10/06* (2023.01)
*G06Q 10/0631* (2023.01)
*G06Q 10/0633* (2023.01)

(52) U.S. Cl.
CPC .......... *G06Q 10/063112* (2013.01); *G06Q 10/063116* (2013.01); *G06Q 10/0633* (2013.01)

(58) Field of Classification Search
None
See application file for complete search history.

(56) References Cited

U.S. PATENT DOCUMENTS 8,768,738 B2    7/2014  Jacobs
2014/0046585 A1*  2/2014  Morris, IV ........... G06Q 10/047
                                                         701/400

(Continued)

FOREIGN PATENT DOCUMENTS

WO    WO-2021012020 A1 *  1/2021  ..... G06Q 10/063112

OTHER PUBLICATIONS

Lu, E.H.C. and Yang, Y.W., 2019. A hybrid route planning approach for logistics with pickup and delivery. Expert Systems with Applications, 118, pp. 482-492. (Year: 2019).*

(Continued)

*Primary Examiner* — Chesiree A Walton
*Assistant Examiner* — Marjorie Pujols-Cruz
(74) *Attorney, Agent, or Firm* — BRYAN CAVE LEIGHTON PAISNER LLP (57) ABSTRACT

A system including one or more processors and one or more non-transitory computer-readable media storing computing instructions that, when executed on the one or more processors, perform: determining one or more work orders for a service provider; determining an optimal service route for the one or more work orders; updating an available time slot in a work schedule of the service provider; and transmitting the work schedule updated with the optimal service route to be displayed on a user interface executed on a device of the service provider. Other embodiments are also provided.

20 Claims, 5 Drawing Sheets

(56) References Cited

U.S. PATENT DOCUMENTS

2016/0140507 A1   5/2016  Stevens et al.
2019/0130354 A1*  5/2019  Han .................. G06Q 10/0832
2020/0184407 A1*  6/2020  Mappus ................ G06N 20/00
2020/0210965 A1*  7/2020  Garber ............... G06Q 10/0633

OTHER PUBLICATIONS

"Intelligent Scheduling Software" by Commusoft, accessed Jul. 7, 2021 at https://www.commusoft.us/feature/intelligent-scheduling-software/, 27 pages.

"eFLEXS Field Service Scheduling Software: Workforce scheduling & route planning" by eFLEXS, accessed Jul. 7, 2021 at https://eflexs.com/en/field-service-scheduling-software/, 14 pages.

"SAP Field Service Management" by SAP, accessed Jul. 7, 2021 at https://www.sap.com/india/products/field-service-management.html, 11 pages.

* cited by examiner

410 Training a machine learning algorithm to determine the respective duration of an unprocessed work order

---

420 Determining one or more work orders for a service provider based at least in part on the respective duration of each of the one or more work orders

- 421 Selecting each of the one or more work orders from unprocessed work orders stored in a database

- 422 Determining by the machine learning algorithm, as trained, the respective duration of the each of the one or more work orders

---

430 Determining an optimal service route for the one or more work orders

- 431 Determining one or more feasible service routes for the one or more work orders

---

440 Success? — NO → (back to 420)
YES ↓

---

450 Updating an available time slot in a work schedule of the service provider based on the optimal service route

---

460 Transmitting the work schedule updated with the optimal service route to be displayed on a user interface executed on a device of the service provider

AUTOMATICALLY SCHEDULING AND ROUTE PLANNING FOR SERVICE PROVIDERS

CROSS-REFERENCE TO RELATED APPLICATIONS

This application claims priority to U.S. Provisional Patent Application No. 63/194,587, filed May 28, 2021. U.S. Provisional Patent Application No. 63/194,587 is incorporated herein by reference in its entirety.

TECHNICAL FIELD

This disclosure relates generally to automatically scheduling work orders for service providers.

BACKGROUND

Existing work order scheduling systems merely assign work orders, such as tickets for repairing equipment, to service providers, e.g., technicians, according to pre-determined automated rules, based on the type of the work and/or the priority of the work orders. The pre-determined automated rules generally do not predict the duration for servicing work orders dynamically or accurately for a specific group of service providers. Further, the conventional systems do not take into account the expertise, work-load, and/or work schedule of the technicians. Thus, the work orders so assigned are sometimes not completed as planned and would have to be reassigned to other service providers, which causes delay and/or extra costs, when expedited services become necessary because of the delay. Additionally, when the services are to be provided in different places, the work orders assigned to a service provider by the conventional systems can be scheduled in a sequence that requires the service provider to take longer routes than needed. Therefore, systems and/or methods that can dynamically schedule work orders for service providers so that the work orders can be timely completed with less time wasted in driving are desired.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 1:
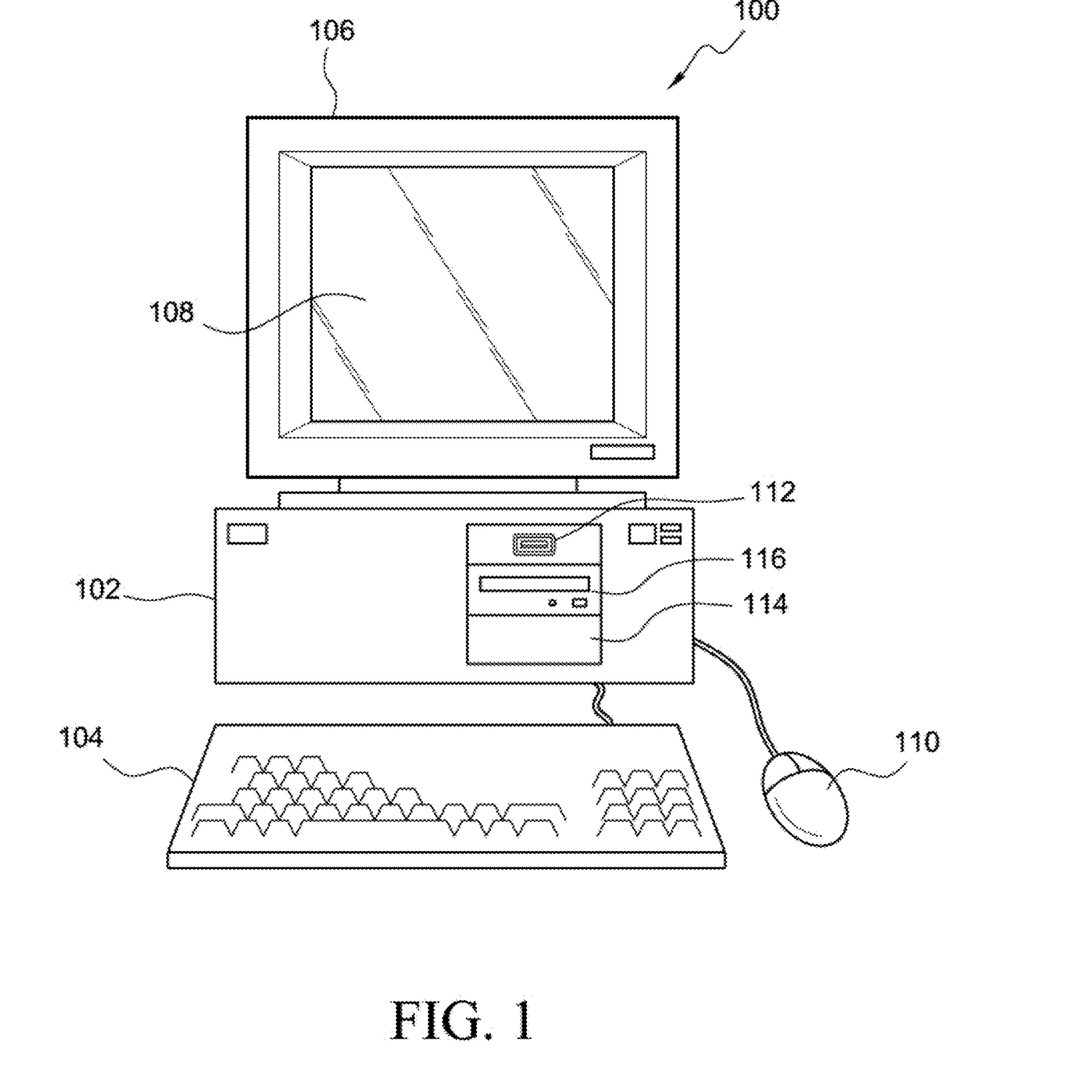
FIG. 1 illustrates a front elevation view of a computer system that is suitable for implementing an embodiment of the system disclosed in FIG. 3.
Figure 2:
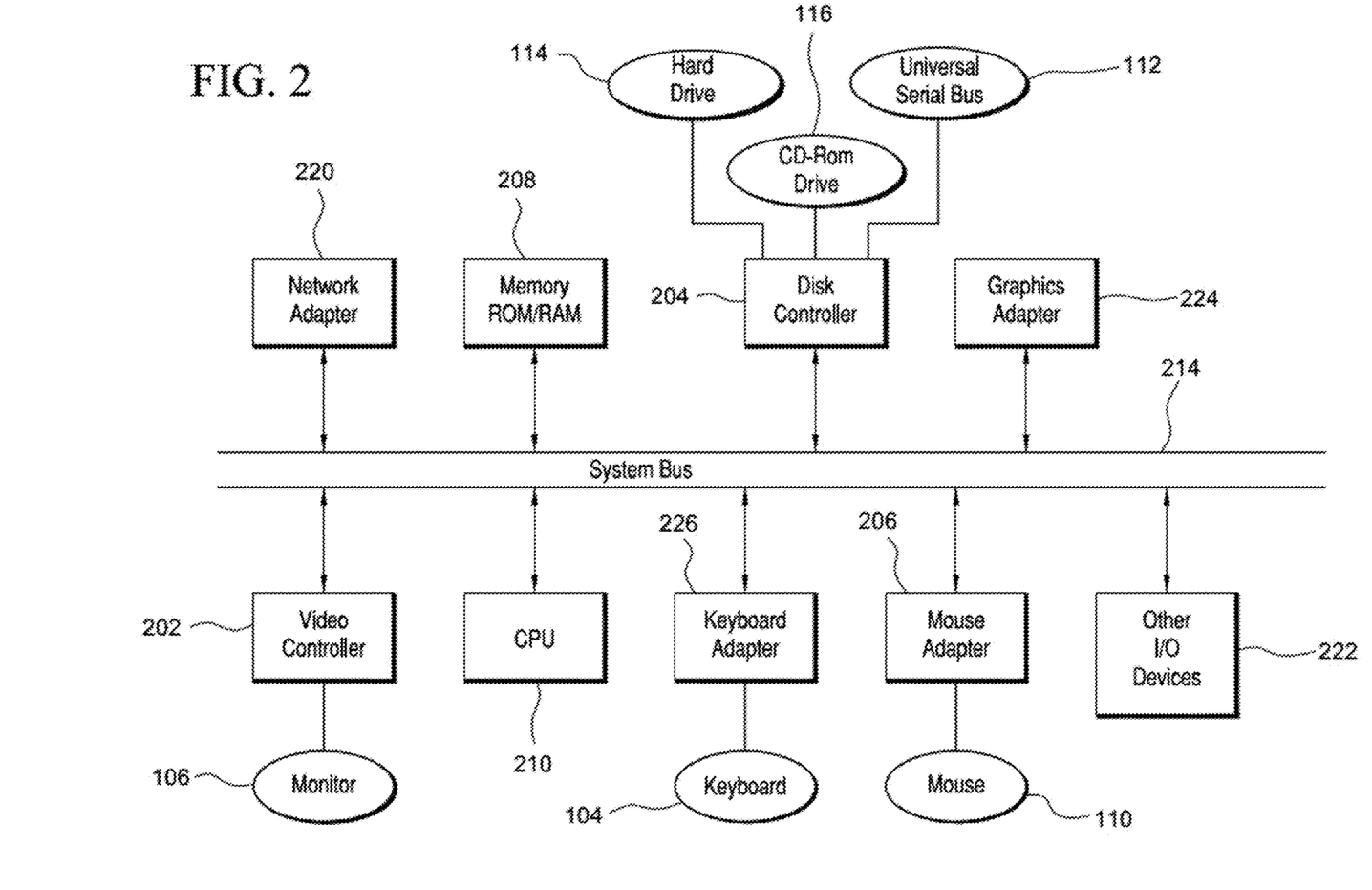
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. (Microsoft) of Redmond, Washington, United States of America, (ii) Mac® OS X by Apple Inc. (Apple) of Cupertino, California, United States of America, (iii) UNIX® OS, and (iv) Linux® OS. Further exemplary operating systems can comprise one of the following: (i) the iOS® operating system by Apple, (ii) the Blackberry® operating system by Research In Motion (RIM) of Waterloo, Ontario, Canada, (iii) the WebOS operating system by LG Electronics (LG) of Seoul, South Korea, (iv) the Android™ operating system developed by Google, Inc. (Google) of Mountain View, California, United States of America, or (v) the Windows Mobile™ operating system by Microsoft.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
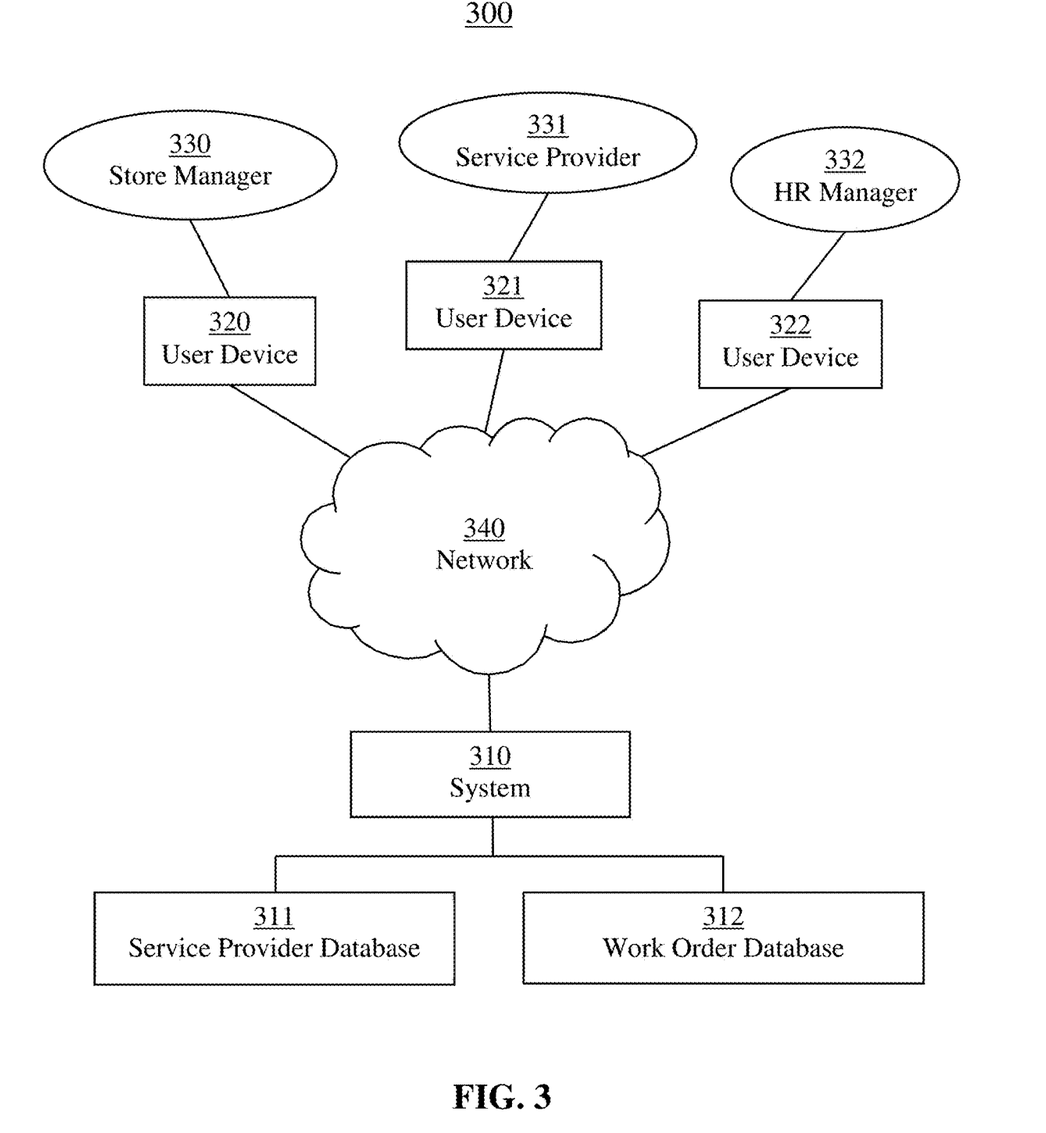
FIG. 3 illustrates a block diagram of a system that can be employed for automatically scheduling and route planning for service providers, according to an embodiment.

Turning ahead in the drawings, FIG. 3 illustrates a block diagram of a system 300 that can be employed for automatically scheduling and route planning for service providers, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., system 310) and one or more user devices (e.g., user devices 320, 321, and/or 322) for various users (e.g., a store manager 330, a service provider 331, and/or a human resource (HR) manager 332). System 310 and/or user devices 320, 321, and/or 322 can each be a computer system, such as computer system 100 (FIG. 1), as described above, and can each be a single computer, a single server, or a cluster or collection of computers or servers, or a cloud of computers or servers. In another embodiment, a single computer system can host each of system 310 and/or user devices 320, 321, and/or 322. In many embodiments, system 310 can be modules of computing instructions (e.g., software modules) stored at non-transitory computer readable media that operate on one or more processors. In other embodiments, system 310 can be implemented in hardware.

In many embodiments, system 310 can comprise one or more systems, subsystems, modules, or servers. Additional details regarding system 310 and/or user devices 320, 321, and/or 322 are described herein.

In some embodiments, system 310 can be in data communication, through a computer network, a telephone network, or the Internet (e.g., network 340), with user devices 320, 321, and/or 322. In some embodiments, user devices 320, 321, and/or 322 can be used by users, such as store manager 330, service provider 331, and/or HR manager 332. In a number of embodiments, system 310 can comprise a front end subsystem that hosts one or more websites and/or mobile application servers. For example, the front end subsystem of system 310 can host a website, or provide a server that interfaces with an application (e.g., a mobile application, a web browser, or a calendar application), on user devices 320, 321, and/or 322, which can allow users, such as store manager 330, service provider 331, and/or HR manager 332, to browse and/or search for items (e.g., a work order or a service provider), to add items (e.g., creating a new work order or adding a newly hired service provider), and/or to manage data for the items (e.g., updating a priority of a work order or a work schedule of a service provider), in addition to other suitable activities.

In some embodiments, an internal network (e.g., network 340) that is not open to the public can be used for communications between system 310 and user devices 320, 321, and/or 322 within system 300. Accordingly, in some embodiments, system 310 (and/or the software used by such systems) further can comprise a back end subsystem operated by an operator and/or administrator of system 310. For example, the back end subsystem of system 310 can host a machine learning server, a work order management server, and/or an HR management server, which can iteratively train a machine learning algorithm to predict a respective duration of an unprocessed work order, determine, based on the machine learning algorithm, the respective duration of a new unprocessed work order, assign a new unprocessed work order to service provider 331, automatically plan an optimal service route, and/or update a work schedule of service provider 331, in addition to other suitable activities. In these or other embodiments, the operator and/or administrator of system 310 can manage system 310, the processor(s) of system 310, and/or the memory storage unit(s) of system 310 using the input device(s) and/or display device(s) of system 310.

In certain embodiments, the user devices (e.g., user devices 320, 321, and/or 322) can be desktop computers, laptop computers, a mobile device, and/or other endpoint devices used by one or more users (e.g., store manager 330, service provider 331, and/or HR manager 332). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., a service provider database 311 or a work order database 312). The one or more databases can include a service provider database (e.g., 311) that contains information about service providers, such as technicians, including the respective work schedule, skill level, past performance, and/or work orders assigned to each service provider (e.g., 331), as described below in further detail. The one or more databases further can include a work order database (e.g., 312) that contains work orders, including information related to the work orders, such as a status (e.g., unprocessed/unassigned, in-process/incomplete, pending the result of another event (e.g., the delivery of parts), cancelled, and/or fulfilled or closed, etc.), a priority (e.g., high, medium, and/or low), a value or cost (e.g., a market price for the work order, etc.), an age of each work order (e.g., the number of days since a work order is created), and so forth, as described below in further detail. Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases (e.g., service provider database 311 and/or work order database 312) can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, and/or the one or more databases (e.g., service provider database 311 and/or work order database 312) can be implemented using any suitable manner of wired and/or wireless communication. Accordingly, system 300 and/or system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can determine, in real-time, one or more work orders for a service provider (e.g., service provider 331) based at least in part on a respective duration of each of the one or more work orders. Examples of the one or more work orders can include tickets or requests for services initiated by an individual, a department, or a business for repairing or maintaining tools, appliances, facilities, etc. System 310 further can select, in real-time, service provider 331 from one or more service providers whose information is stored in a database (e.g., service provider database 311). For instance, a service provider can be an individual or an entity, such as a technician or a contractor, that performs the services requested.

To determine the one or more work orders for service provider 331, system 310 can select, in real-time, each of the one or more work orders from unprocessed work orders stored in work order database 312. System 310 additionally can determine, in real-time, the respective duration of each work order based on a pre-determined formula, input data by a system administrator or operator, an average time used to fulfill similar work orders by one or more service providers in the past, or a pre-trained machine learning algorithm, etc.

In a number of embodiments, system 310 further can determine, in real-time, an optimal service route for the one or more work orders. For purposes of clarity, an optimal service route does not necessarily have to be the absolute best service route in all circumstances, but in some embodiments, an optimal service route can be a service route that is customized or that is better than at least one other or most other service routes. System 300 can determine the optimal service route based at least in part on one or more weighted factors. Examples of the weighted factors can include a respective priority of each of the one or more work orders (e.g., low, medium, or high), a respective value of each of the one or more work orders (e.g., a cost associated with the work order), a respective age of each of the one or more work orders (e.g., a number of days from the date the work order is created to this date), and/or a respective travel time between each pair of adjacent work orders of the one or more work orders in the optimal service route determined, in real-time, based at least in part on a respective service location of each of the each pair of adjacent work orders and/or a real-time or historical traffic condition.

In some embodiments, system 310 can determine the optimal service route by choosing the optimal service route from one or more feasible service routes based on a respective score of each feasible service route, calculated based on the one or more weighted factors. System 310 can determine the one or more work orders and/or the one or more feasible service routes for the one or more work orders by any suitable algorithms based on one or more constraints. The one or more constraints can be determined based on laws, regulations, and/or company policies, for the purpose of ensuring employee safety, balancing work load among multiple service providers, and/or increasing employee satisfaction, etc. In certain embodiments, when no feasible service routes can be found, system 310 can re-determine the one or more work orders by, for example, reducing the number of work orders or replacing the one or more work orders, in part or entirely, by one or more other unprocessed work orders stored in work order database 312.

In several embodiments, system 310 additionally can update, in real-time, an available time slot (e.g., 8 am-12 pm of a specific date, a work shift, or the coming week, etc.) in a work schedule of the service provider (e.g., service provider 311) based on the optimal service route. System 310 can update the work schedule of service provider 331 by: adding the optimal service route to the available time slot when available time slot is free, or overwriting the available time slot with the optimal service route, when the available time slot was booked previously. In some embodiments, system 310 further can transmitting, in real-time through computer network 340, the work schedule updated with the optimal service route to be displayed on a user interface executed on user device 321 of service provider 331. System 310 or user device 321 also can provide any suitable notice (e.g., an email, a text message, a ring, a pop-up dialog box, etc.) to notify service provider 331 of any changes in the work schedule.

In a number of embodiments, system 310 further can determine a performance of service provider 331 based at least in part on: a processing duration deviation for each of one or more past work orders fulfilled by service provider 331, a timeliness indication for each of the one or more past work orders (e.g., finishing a work order by the requested deadline or not), a check-in count for each of the one or more past work orders (e.g., the number of visits needed to finish a work order), or a customer review for each of the one or more past work orders (e.g., a review score by store manager 330). The performance can include a score, a ranking, and/or a multi-value data set, etc. System 310 additionally can transmit, via network 340, a performance monitoring user interface for tracking the performance of service provider 331 to be displayed on a remote user device, such as user device 321 or 322 of service provider 331 or HR manager 332.

In some embodiments, system 310 further can receive, via the computer network 340, a status update for a processed work order of the one or more work orders from the user interface executed on user device 321 of service provider 331 and then update, in real-time, the processed work order stored in work order database 312 based on the status update. The status update can include any change to the processed work order, including changing the status from "unprocessed" to "in-process" (e.g., when service provider 331 is onsite working on the work order), "fulfilled/closed" (e.g., when service provider 331 finishes the work order), "pending the delivery of parts" (e.g., when service provider 331 determines onsite that new parts are needed), "a follow-up work order needed" (e.g., when service provider 331 couldn't finish it in this work shift), and so forth. In a few embodiments, system 310 further can reschedule the processed work order if the status of the processed work order is "pending the delivery of parts" and/or "a follow-up work order needed" to the same service provider or a different service provider.

Conventional systems are unable to automatically schedule respective one or more work orders for each service provider so that each service provider has a feasible work schedule with as many work orders as possible while balancing the respective work load (e.g., by limiting the number of work orders per shift and/or limiting the total travel time). This is because conventional systems typically lack the ability to timely and accurately predict the respective duration of each work order to enable the dynamic scheduling of the respective one or more work orders for each service provider. In many embodiments, work order scheduling techniques provided by system 300 and/or system 310 can advantageously address the problem by determining, in real-time by a machine learning algorithm pre-trained based on the historical data related to the past work orders and the service providers, the respective duration of the each of the one or more work orders.

Figure 4:
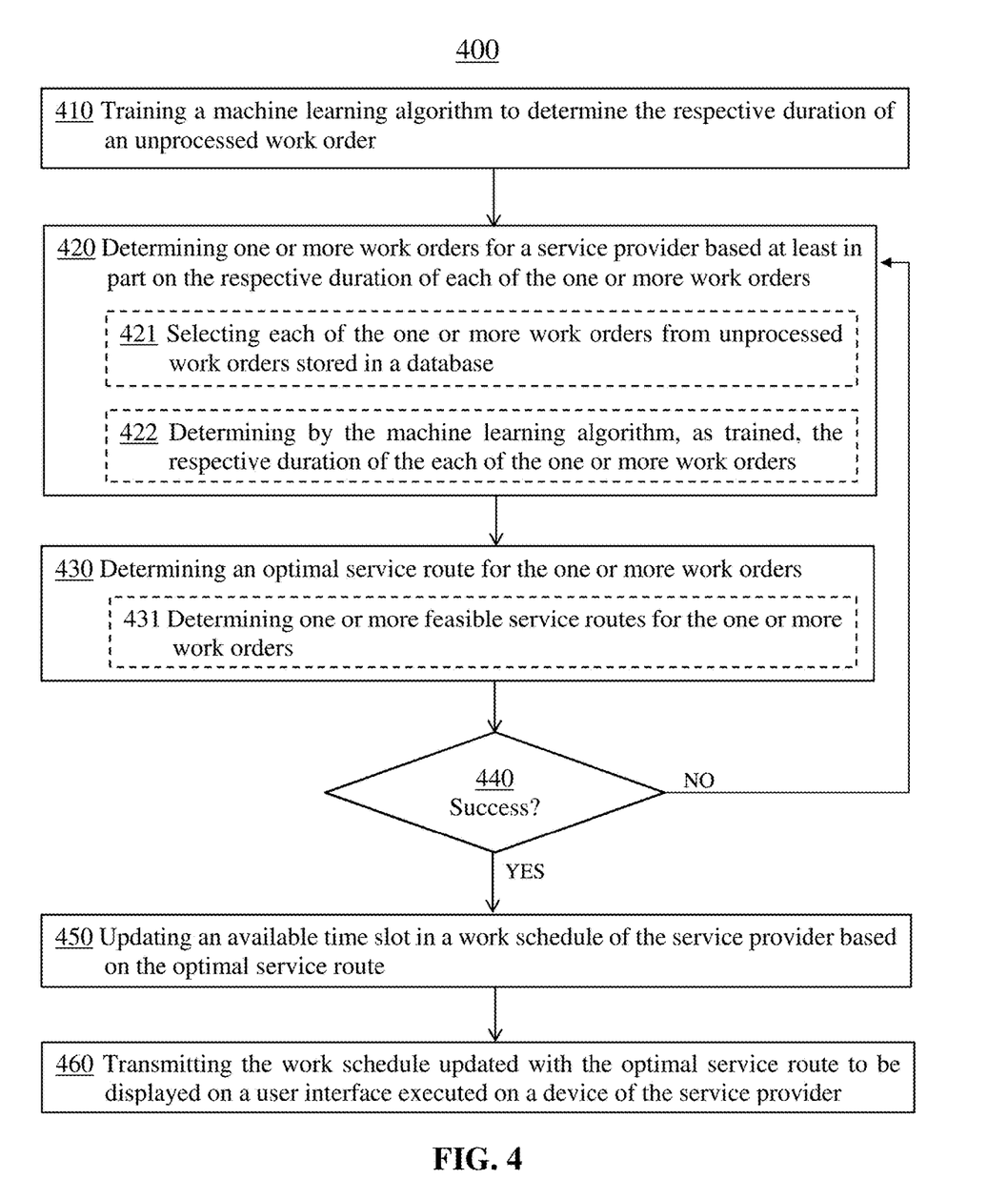
FIG. 4 illustrates a flow chart for a method for automatically scheduling and route planning for service providers, according to an embodiment.

Turning ahead in the drawings, FIG. 4 illustrates a flow chart for a method 400, according to an embodiment. In many embodiments, method 400 can be implemented via execution of computing instructions on one or more processors for automatically scheduling work orders for service providers. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3) and/or system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3). The processor(s) can be similar or identical to the processor(s) described above with respect to computer system 100 (FIG. 1).

In many embodiments, method 400 can be performed by a computer server, such as system 300 (FIG. 3) and/or system 310 (FIG. 3), to train a machine learning algorithm to determine the respective duration of an unprocessed work order (block 410). In a number of embodiments, the training of the machine learning algorithm can be supervised or semi-supervised by an operator/administrator of the computer server (e.g., system 300 (FIG. 3) or system 310 (FIG. 3)) performing block 410. The machine learning model can be any suitable machine learning models such as decision trees, Support Vector Machines, Gradient Boosted Machines (GBM) using target encoding, Random Forest in addition to Decision Trees and XGBoost, etc.

In some embodiments, the machine learning algorithm can be iteratively trained based on historical data, such as historical input data and historical output data for one or more fulfilled work orders, obtained from a database (e.g., work order database 312 (FIG. 3)) periodically (e.g., daily, weekly, or monthly). For example, the historical input data can include a respective trade, a respective problem code, a respective region, or a respective category of each of the one or more fulfilled work orders. The historical input data also can include a respective skill level of a respective performing service provider for each of the one or more fulfilled work orders. The historical output data can include a respective historical check-in time and a respective historical check-out time for each of the one or more fulfilled work orders.

The respective trade for each of the one or more fulfilled work orders can include a name of the department or the field of service for which the each fulfilled work order was opened. For example, the respective trade can be "forklifts," "parking lot," "door/overhead door," "fencing," "electrical," etc. The respective problem code for a fulfilled work order can include a code or a description to identify the issue(s) to be fixed or maintained for the respective trade, such as a problem code "parking lot signing" for the trade "parking lot," a problem code "chain link" for the trade "fencing," a problem code "lights not working" for the trade "door/overhead door," and a problem code "to be determined onsite" or "repair-emergency" for any of the aforementioned respective trades, etc. The respective region for a fulfilled work order can include a geographic region of the respective service location, such as Bentonville, Arkansas or San Bruno, California. The respective category for a fulfilled work order can include the nature of the service, such as whether the fulfilled work order is related to repairs or scheduled maintenance, etc.

Referring to FIG. 4, method 400 further can include determining, in real-time, one or more work orders for a service provider (e.g., 331 (FIG. 3)) based at least in part on the respective duration of each of the one or more work orders (block 420). Block 420 can include block 421 for selecting each of the one or more work orders from unprocessed work orders stored in a database (e.g., work order database 312 (FIG. 3)) and/or block 422 for determining by the machine learning algorithm, as trained in block 410, the respective duration of the each of the one or more work orders.

Block 420 further can include determining, in real-time, the one or more work orders for a service provider (e.g., 311 (FIG. 3)) based at least in part on one or more constraints. Exemplary constraints can include that no work order can be scheduled beyond the working hours of the service provider, that the number of the work orders per shift for the service provider cannot be greater than a maximum limit (e.g., 5 work orders per 5-hour shift or 10 work orders per 8-hour shift), that each work order can only be scheduled once and assigned to a single service provider, and so forth.

In a number of embodiments, method 400 further can include determining, in real-time, an optimal service route for the one or more work orders (block 430), based at least in part on one or more weighted factors. Block 430 can include determining, in real-time, one or more feasible service routes for the one or more work orders (block 431), based at least in part on one or more constraints, and choosing the optimal service route from the one or more feasible service routes based at least in part on one or more weighted factors. In many embodiments, a mathematical model (e.g., the formula to determine a "Gain" value above) can be adopted to determine the optimal service route among the one or more feasible service routes based on the respective score of each feasible service route.

In some embodiments, the one or more weighted factors can include a respective priority of each of the one or more work orders, a respective value of each of the one or more work orders, a respective age of each of the one or more work orders, and/or a respective travel time between each pair of adjacent work orders of the one or more work orders in a feasible service route determined in real-time based on a respective service location of each of the each pair of adjacent work orders. In some embodiments, the respective travel time between each pair of adjacent work orders of the one or more work orders in a feasible service route further can be determined based at least in part on a real-time or historical traffic condition between each pair of adjacent work orders.

Here, the respective priority of each work order can be assigned by a user who requested or opened the each work order (e.g., store manager 330 (FIG. 3)) or a default priority value (e.g., low or medium). The respective age of each work order can be the number of days passed since the work order was opened. The respective value of each work order can include the cost or market value for the service requested in the each work order. A pair of adjacent work orders can include a work order ($WO_x$) and another work order ($WO_y$) that is scheduled immediately after $WO_x$ in the optimal service route, and the respective drive time between this pair of adjacent work orders $WO_x$ and $WO_y$ can be an estimated time for the service provider to move from the respective service location of $WO_x$ to the respective service location of $WO_y$.

Examples of the one or more constraints can include that no work order can be scheduled beyond the working hours of the service provider, that the total drive time for a service route cannot exceed a certain threshold (e.g., 60 minutes, 90 minutes, or 150 minutes per service route per shift or day), that the number of the work orders per shift for the service provider cannot be greater than a maximum limit, that each work order can only be scheduled once and assigned to a single service provider, and so forth.

In an exemplary embodiment, the act of determining the optimal service route can include determining a score (i.e., the "Gain" value below) for the optimal service route based on the abovementioned weighted factors, using the following formula:

$$\text{Gain} = \Sigma_{i=0}^{n} \Sigma_{j=1, i \neq j}^{n+1} (e_{ij} * w_{ij}), \text{ wherein:}$$

n: the number of work orders ($WO_S$) in a service route;

$w_{ij}$: whether the $j^{th}$ WO ($WO_j$) is scheduled immediately after and adjacent to the $i^{th}$ WO ($WO_i$) in the service route; 1 means yes and 0 means no, $\forall i \in \{0, n\}$, $\forall j \in \{1, n+1\}$ ($WO_0$: a virtual work order for the starting location of the service provider;

$WO_{n+1}$: a virtual work order for the ending location of the service provider); and $e_{ij}$: a priority score for $w_{ij}$, which can be determined based on:

$$e_{ij} = \frac{W_1 * p'_j + W_2 * q'_j + W_3 * c'_j}{s'_{ij} + 0.0001},$$

wherein:

$p_j$: a normalized priority value for $WO_j$;
$q_j$: a normalized age value for $WO_j$;
$c_j$: a normalized cost value for $WO_j$;
$s_{ij}$: a normalized drive time value between the respective service locations of $WO_i$ and $WO_j$; and
$W_1$, $W_2$, and $W_3$: respective weights for $p_j$, $q_j$, and $c_j$ (determined manually or by a machine learning model trained based on historical data); and $W_1+W_2+W_3=1$.

Still referring to FIG. 4, method 400 further can re-determine, in real-time, the one or more work orders for the service provider (e.g., 331 (FIG. 3)) and/or the optimal service route (e.g., re-performing some or all of the activities in blocks 420 and/or 430) when the optimal service route cannot be found (block 440). In some embodiments, method 400 additionally can re-determine, in real-time, the one or more work orders or the optimal service route for the service provider upon receiving, via the computer network, an indication of a triggering event. Examples of the triggering events can include a new unprocessed work order being added to the database (e.g., work order database 312 (FIG. 3)), a change in the work schedule of the service provider (e.g., 331 (FIG. 3)), an update in the one or more work orders by the service provider (e.g., 331 (FIG. 3)) or by a store manager (e.g., 330 (FIG. 3)), and so froth.

In many embodiments, method 400 further can update an available time slot in a work schedule of the service provider (e.g., 331 (FIG. 3)) based on the optimal service route (block 450), which can be performed after the optimal service route can be found (block 440). In block 450, the available time slot can be the remaining of the work shift of the current working day, the next working day, the next 5 working days, and/or the rest of the week/month, etc. for the service provider (e.g., 331 (FIG. 3)). Updating the available time slot can include (a) adding the optimal service route to the available time slot, when the available time slot is free; or (b) overwriting the available time slot with the optimal service route. The work schedule of the service provider can be stored in the service provider database (e.g., 311 (FIG. 3)) and/or a user device (e.g., 321 (FIG. 3)) for the service provider (e.g., 331 (FIG. 3)).

Furthermore, method 400 in some embodiments can include transmitting, in real-time through a computer network (e.g., network 340 (FIG. 3)), the work schedule updated in block 450 with the optimal service route to be displayed on a user interface executed on a user device (e.g., 321 (FIG. 3)) of the service provider (e.g., 331 (FIG. 3)) (block 460). In a few embodiments, the user interface also can be executed on devices of one or more other users, such as a system administrator/operator, a manager of the service provider, etc. In several embodiments, the user interface for displaying the work schedule can be any suitable user interfaces, such as a user interface of a proprietary website or App, or the user interface of a calendar App, including Outlook Calendar™ by Microsoft or Google Calendar™ by Google, etc. In certain embodiments, the device of the service provider and/or the devices of the one or more other users each can be computer system 100 (FIG. 1), a desktop computer, a laptop computer, a mobile device, and/or another endpoint device used by the service provider (e.g., 331 (FIG. 3)).

In a number of embodiments, method 400 additionally can include determining a performance of the service provider (e.g., 331 (FIG. 3)) based at least in part on one or more performance indicators, such as: (a) a processing duration deviation for each of one or more past work orders fulfilled by the service provider (e.g., 331 (FIG. 3)) (e.g., how much more/less time the service provider spent on each past work order compared to the average time used by all of the service providers for similar work orders); (b) a timeliness indication for each of the one or more past work orders fulfilled by the service provider (e.g., whether the service provider finished each past work order by or before the requested deadline); (c) a check-in count for each of the one or more past work orders (e.g., the respective number of times the service provider checks in at the respective service location to fulfill each of the one or more past work order); and/or (d) a customer review for each of the one or more past work orders by a customer or a store manager (e.g., store manager 330 (FIG. 3)) provided via a customer device (e.g., user device 320 (FIG. 3)) through a computer network (e.g., 340 (FIG. 3)). The performance of the service provider (e.g., 331 (FIG. 3)) and/or the performance indicators can be stored in a database (e.g., service provider database 311 (FIG. 3)).

In a number of embodiments, method 400 also can include providing a performance monitoring user interface configured to be executed on a remote user device (e.g., 321 (FIG. 3) and/or 322 (FIG. 3)) to display and track the performance of the service provider (e.g., 331 (FIG. 3)). The remote user device can be the device (e.g., user device 321 (FIG. 3)) of the service provider (e.g., 331 (FIG. 3)), or a personal computer or mobile device (e.g., user device 322 (FIG. 3)) used by the HR department or the manager (e.g., HR manager 332 (FIG. 3)) of the service provider, etc. The performance monitoring user interface can be configured for a user (e.g., service provider 331 (FIG. 3) and/or HR manager 332 (FIG. 3)) to access and/or track the performance data of a service provider and/or the abovementioned performance indicators for each of the past work orders fulfilled by the service provider, etc. The performance monitoring user interface further can be configured to display the performance data of the one or more service providers for the user (e.g., HR manager 332 (FIG. 3)) to compare the performance of the service provider with that of the other service providers among the one or more service providers. The performance monitoring user interface can display the performance data and/or the performance indicators in any suitable format, such as text, tables, histograms, bar charts, pie charts, line charts, histograms, etc.

In some embodiments, method 400 additionally can include receiving, via the computer network (e.g., 340 (FIG. 3)), a status update for a processed work order of the one or more work orders from the user interface executed on the device (e.g., 321 (FIG. 3)) of the service provider (e.g., 331 (FIG. 3)). Method 400 can, upon receiving the status update, update, in real-time, the processed work order stored in the database (e.g., work order database 312 (FIG. 3)) based on the status update.

Figure 5:
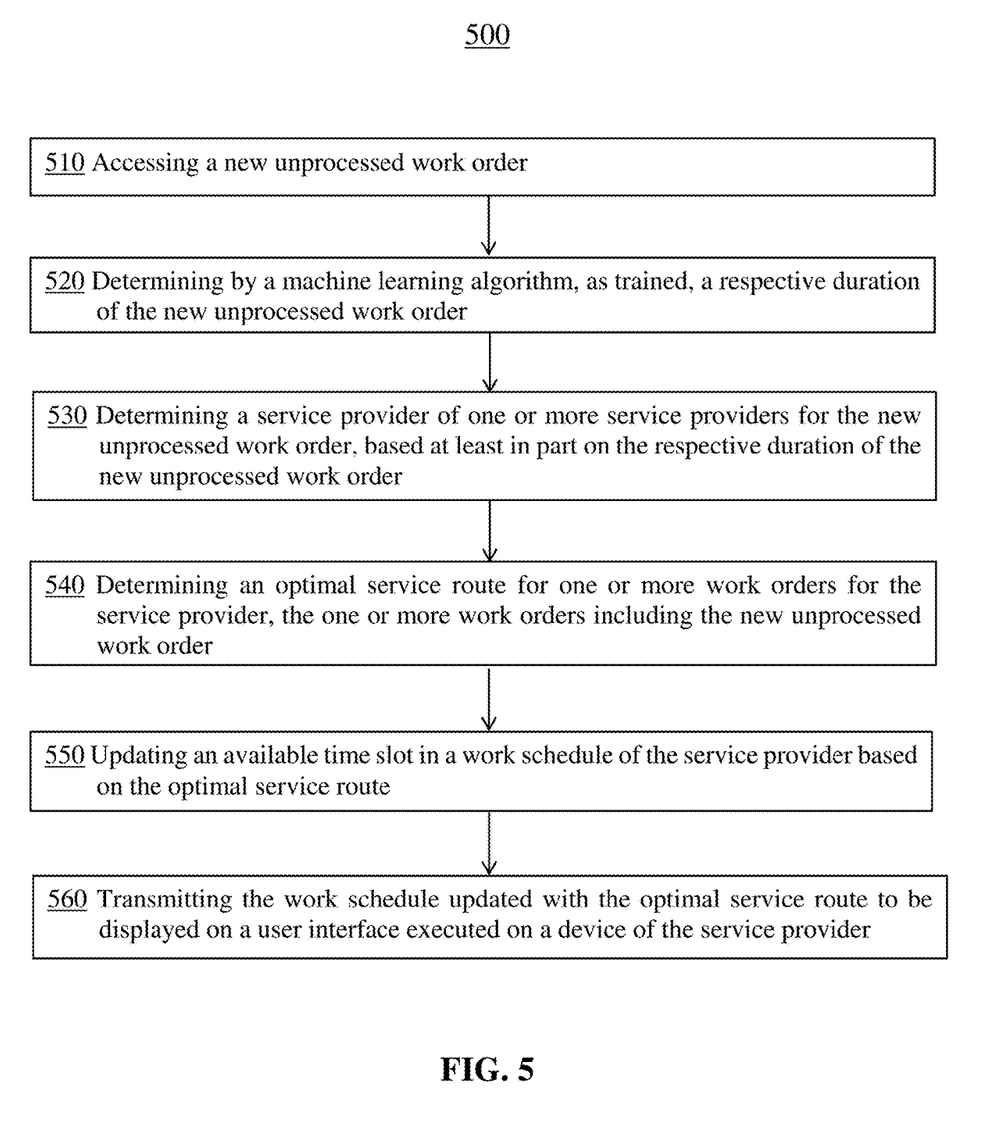
FIG. 5 illustrates a flow chart for a method for automatically assigning a new unprocessed work order to a service provider, according to another embodiment.

Turning ahead in the drawings, FIG. 5 illustrates a flow chart for a method 500, according to an embodiment. In many embodiments, method 500 can be implemented via execution of computing instructions on one or more processors, and the computing instructions can be stored at one or more non-transitory computer-readable media and, when executed on the one or more processors, perform automatically assigning a new unprocessed work order to a service provider (e.g., 331 (FIG. 3)). Method 500 is merely exemplary and is not limited to the embodiments presented herein. Method 500 can be employed in many different embodiments or examples not specifically depicted or described herein. In some embodiments, the procedures, the processes, the activities, and/or the blocks of method 500 can be performed in the order presented. In other embodiments, the procedures, the processes, the activities, and/or the blocks of method 500 can be performed in any suitable order. In still other embodiments, one or more of the procedures, the processes, the activities, and/or the blocks of method 500 can be combined or skipped. In a number of embodiments, some or all of the procedures, the processes, the activities, and/or the blocks of method 500 can be similar or identical to some or all of the procedures, the processes, the activities, and/or the blocks of method 400 (FIG. 4).

In many embodiments, system 300 (FIG. 3) and/or system 310 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as system 300 (FIG. 3) and/or system 310 (FIG. 3). The processor(s) can be similar or identical to the processor(s) described above with respect to computer system 100 (FIG. 1).

Referring to FIG. 5, method 500 can be performed by a computer server, such as system 300 (FIG. 3) and/or system 310 (FIG. 3), to access a new unprocessed work order (block 510) from a database (e.g., work order database 312 (FIG. 3)). Block 510 can access the new unprocessed work order after receiving, via network 340 (FIG. 3), a notification that the new unprocessed work order is added by a user (e.g., store manager 330 (FIG. 3)) from a user device (e.g., 320 (FIG. 3)).

In many embodiments, method 500 can determine, in real-time, by a machine learning algorithm, as trained, a respective duration of the new unprocessed work order (block 520). The machine learning algorithm can be similar or identical to the machine learning algorithm trained in block 410 (FIG. 4). Block 520 can be similar or identical to block 422 (FIG. 4).

In a number of embodiments, method 500 also can determine a service provider (e.g., 331 (FIG. 3)) of one or more service providers for the new unprocessed work order, based at least in part on the respective duration of the new unprocessed work order (block 530). The one or more service providers can be selected from a service provider database (e.g., 311 (FIG. 3)). Block 530 can include some or all of the activities in block 420 (FIG. 4) for the one or more service providers. Block 530 further can include determining the service provider among the one or more service providers for the new unprocessed work order based on any suitable criteria. For example, block 530 can choose the first one of the one or more service providers whose work schedule can include the new unprocessed work order, or the least busy one of the one or more service providers to assign the new unprocessed work order to, etc.

In several embodiments, method 500 further can determine, in real-time, an optimal service route for one or more work orders for the service provider, the one or more work orders including the new unprocessed work order (block 540). Block 540 can be similar or identical to block 430 (FIG. 4).

Still referring to FIG. 5, method 500 further can update, in real-time, an available time slot in a work schedule of the service provider based on the optimal service route (block 550). Block 550 can be similar or identical to block 450 (FIG. 4). Method 500 additionally can transmit, in real-time via the computer network (e.g., 340 (FIG. 3)), the work schedule updated with the optimal service route to be displayed on a user interface executed on a device of the service provider (block 560). Block 560 can be similar or identical to block 460 (FIG. 4).

Various embodiments can include a system for scheduling one or more work orders for service providers. The system can include one or more processors and one or more non-transitory computer-readable media storing computing instructions that, when executed on the one or more processors, perform various acts. In a number of embodiments, the acts can include determining, in real-time, one or more work orders for a service provider based at least in part on a respective duration of each of the one or more work orders. The act of determining the one or more work orders for the service provider further can include acts such as selecting, in real-time, each of the one or more work orders from unprocessed work orders stored in a database; and/or determining, in real-time by a machine learning algorithm, as trained, the respective duration of the each of the one or more work orders.

In some embodiments, the acts further can include determining, in real-time, an optimal service route for the one or more work orders based at least in part on one or more weighted factors. The acts additionally can include updating, in real-time, an available time slot in a work schedule of the service provider based on the optimal service route. In several embodiments, the acts also can include transmitting, in real-time through a computer network, the work schedule updated with the optimal service route to be displayed on a user interface executed on a device of the service provider.

Further, various embodiments can include a method being implemented via execution of computing instructions configured to run at one or more processors and stored at one or more non-transitory computer-readable media. The method can comprise determining, in real-time, one or more work orders for a service provider based at least in part on a respective duration of each of the one or more work orders. The one or more work orders can be selected from unprocessed work orders stored in a database. The database can include one or more of the databases provided herein, such as a MySQL (Structured Query Language) Database, PostgreSQL Database, Microsoft SQL Server Database, and so forth. Furthermore, each of the unprocessed work orders can comprise the respective duration, a respective service location, a respective priority, a respective value, and/or a respective age, etc.

In a number of embodiments, the method also can include determining, in real-time, an optimal service route for the one or more work orders based at least in part on one or more weighted factors. The one or more weighted factors can comprise one or more of: (a) the respective priority of each of the one or more work orders; (b) the respective value of each of the one or more work orders; (c) the respective age of each of the one or more work orders; and/or (d) a respective drive time between each pair of adjacent work orders of the one or more work orders in the optimal service route determined in real-time based on the respective service location of each of the each pair of adjacent work orders and a traffic condition, etc.

In certain embodiments, the method additionally can include updating, in real-time, an available time slot in a work schedule of the service provider by: (a) adding the optimal service route to the available time slot, or (b) overwriting the available time slot with the optimal service route. The method further can include transmitting, in real-time through a computer network, the work schedule updated with the optimal service route to be displayed on a user interface executed on a device of the service provider.

In some embodiments, the method further can include determining a performance of the service provider based at least in part on one or more of: (a) a processing duration deviation for each of one or more past work orders fulfilled by the service provider; (b) a timeliness indication for each of the one or more past work orders; (c) a check-in count for each of the one or more past work orders; or (d) a customer review for each of the one or more past work orders, etc. With the performance of the service provider determined, the method also can include providing a performance monitoring user interface configured to be executed on a remote user device to display and track the performance of the service provider.

In a few embodiments, the method further can include prior to determining the optimal service route, determining, in real-time, one or more service routes for the one or more work orders based at least in part on one or more constraints (e.g., the one or more constraints described above). The one or more service routes can comprise the optimal service route, and the optimal service route can be determined in any suitable manner (e.g., using the formula provided above).

In several embodiments, the method further can include training a machine learning model to generate the respective duration of each of the one or more work orders, based on: (a) historical input data for one or more fulfilled work orders; and (b) historical output data comprising a respective historical check-in time and a respective historical check-out time for each of the one or more fulfilled work orders. The historical input data can comprise one or more of: a respective trade, a respective problem code, a respective region, or a respective category of each of the one or more fulfilled work orders, etc., as described above.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically scheduling and route planning for service providers has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-2 may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, perform:
training a machine learning algorithm to determine an estimated duration of a new work order, based on (a)

historical input data for the machine learning algorithm and (b) historical output data for the machine learning algorithm, wherein:
the historical input data comprise a respective trade or a respective problem code of each of one or more fulfilled work orders;
determining, in real-time, one or more work orders for a service provider based at least in part on a respective duration of each of the one or more work orders, comprising:
selecting, in real-time, each of the one or more work orders from unprocessed work orders stored in a database; and
determining, in real-time by the machine learning algorithm, as trained, the respective duration of the each of the one or more work orders;
determining, in real-time, an optimal service route for the one or more work orders by calculating a score for the optimal service route by a mathematical formula associated with the one or more work orders, wherein:
the mathematical formula is $\Sigma_{i=0}^{n} \Sigma_{j=1, i \neq j}^{n+1} (e_{ij} * w_{ij})$, wherein:
n comprises a count of the one or more work orders in the optimal service route;
$b_{ij}$ comprises an indication of whether a $j^{th}$ work order ($WO_j$) of the one or more work orders is scheduled immediately after and adjacent to an $i^{th}$ WO ($WO_i$) of the one or more work orders in the optimal service route, wherein:
when $WO_j$ is scheduled immediately after and adjacent to $WO_j$, $b_{ij}$ is equal to 1;
when $WO_j$ is not scheduled immediately after or adjacent to $WO_j$, $b_{ij}$ is equal to 0;
$\forall i \in \{0, n\}$;
$\forall j \in \{1, n+1\}$;
$WO_0$ comprises a virtual work order for a starting location of the service provider; and
$WO_{n+1}$ comprises a virtual work order for an ending location of the service provider; and
$e_{ij}$ comprises a priority score for $b_{ij}$ determined based on $e_{ij} = \Sigma_{k=1}^{m} w_{jk} * f_{jk}/s_{ij} + c$, wherein:
m comprises a count of one or more weighted factors associated with $WO_j$;
$W_{jk}$ comprises a respective weight for a $k^{th}$ factor of the one or more weighted factors associated with $WO_j$ and determined by a second machine learning model;
$f_{jk}$ comprises a respective value for the $k^{th}$ factor of the one or more weighted factors associated with $WO_j$;
$s_{ij}$ comprises a respective normalized drive time value between a respective service location of $WO_i$ and the respective service location of $WO_j$, and
C comprises a constant number;
updating, in real-time, an available time slot in a work schedule of the service provider based on the optimal service route; and
transmitting, in real-time through a computer network, the work schedule updated with the optimal service route to be displayed on a user interface executed on a device of the service provider.

2. The system in claim 1, wherein the one or more weighted factors comprise one or more of:
a respective priority of each of the one or more work orders;
a respective value of each of the one or more work orders; or
a respective age of each of the one or more work orders.

3. The system in claim 1, wherein one or more of:
(a) determining the one or more work orders for the service provider further comprises determining, in real-time, the one or more work orders for the service provider based at least in part on one or more constraints; or
(b) determining the optimal service route for the one or more work orders further comprises determining, in real-time, one or more feasible service routes for the one or more work orders based at least in part on the one or more constraints; and the one or more feasible service routes comprise the optimal service route.

4. The system in claim 3, wherein:
the one or more constraints comprise one or more of:
a work shift constraint for the work schedule of the service provider;
a total travel time limit for the optimal service route;
a maximum count of the one or more work orders of the service provider; or
none of the one or more work orders of the service provider is assigned to another service provider.

5. The system in claim 3, wherein:
determining the optimal service route for the one or more work orders further comprises determining, in real-time, a respective score for each of the one or more feasible service routes based on the mathematical formula.

6. The system in claim 1, wherein:
the historical output data comprise a respective historical check-in time and a respective historical check-out time for each of the one or more fulfilled work orders; and
the historical input data further comprise a respective skill level of a respective performing service provider for each of the one or more fulfilled work orders.

7. The system in claim 1, wherein:
the computing instructions, when executed on the one or more processors, further perform:
re-determining, in real-time, the one or more work orders or the optimal service route for the service provider upon receiving, via the computer network, an indication of a triggering event.

8. The system in claim 7, wherein:
the triggering event comprises one or more of:
a new unprocessed work order being added to the database;
a change in the work schedule of the service provider; or
an update in the one or more work orders of the service provider.

9. The system in claim 1, wherein the computing instructions, when executed on the one or more processors, further perform:
determining a performance of the service provider based at least in part on one or more of:
a processing duration deviation for each of one or more past work orders fulfilled by the service provider;
a timeliness indication for each of the one or more past work orders;
a check-in count for each of the one or more past work orders; or
a customer review for each of the one or more past work orders; and transmitting, via the computer network, a performance monitoring user interface for tracking the performance of the service provider to be displayed on a remote user device.

10. The system in claim 1, wherein the computing instructions, when executed on the one or more processors, further perform:

receiving, via the computer network, a status update for a processed work order of the one or more work orders from the user interface executed on the device of the service provider; and updating, in real-time, the processed work order stored in the database based on the status update.

11. A method being implemented via execution of computing instructions configured to run at one or more processors and stored at one or more non-transitory computer-readable media, the method comprising:

training a machine learning algorithm to determine an estimated duration of a new work order, based on (a) historical input data for the machine learning algorithm and (b) historical output data for the machine learning algorithm, wherein:

the historical input data comprise a respective trade or a respective problem code of each of one or more fulfilled work orders;

determining, in real-time, one or more work orders for a service provider based at least in part on a respective duration of each of the one or more work orders, comprising:

selecting, in real-time, each of the one or more work orders from unprocessed work orders stored in a database; and determining, in real-time by the machine learning algorithm, as trained, the respective duration of the each of the one or more work orders;

determining, in real-time, an optimal service route for the one or more work orders by calculating a score for the optimal service route by a mathematical formula associated with the one or more work orders, wherein:

the mathematical formula is $\Sigma_{i=0}^{n} \Sigma_{j=1, i \ne j}^{n+1}(e_{ij} * w_{ij})$, wherein:

n comprises a count of the one or more work orders in the optimal service route;

$b_{ij}$ comprises an indication of whether a $j^{th}$ work order ($WO_j$) of the one or more work orders is scheduled immediately after and adjacent to an $i^{th}$ WO ($WO_i$) of the one or more work orders in the optimal service route, wherein:

when $WO_j$ is scheduled immediately after and adjacent to $WO_i$, $b_{ij}$ is equal to 1;

when $WO_j$ is not scheduled immediately after or adjacent to $WO_i$, $b_{ij}$ is equal to 0;

$\forall i \in \{0, n\}$;

$\forall j \in \{1, n+1\}$;

$WO_0$ comprises a virtual work order for a starting location of the service provider; and $WO_{n+1}$ comprises a virtual work order for an ending location of the service provider; and $e_{ij}$ comprises a priority score for $b_{ij}$, determined based on $e_{ij} = \Sigma_{k=1}^{m} w_{jk} * f_{jk}/s_{ij} + c$ wherein:

m comprises a count of one or more weighted factors associated with $WO_j$;

$W_{jk}$ comprises a respective weight for a $k^{th}$ factor of the one or more weighted factors associated with $WO_j$ and determined by a second machine learning model;

$f_{jk}$ comprises a respective value for the $k^{th}$ factor of the one or more weighted factors associated with $WO_j$;

$s_{ij}$ comprises a respective normalized drive time value between a respective service location of $WO_j$ and the respective service location of $WO_j$; and C comprises a constant number;

updating, in real-time, an available time slot in a work schedule of the service provider based on the optimal service route; and transmitting, in real-time through a computer network, the work schedule updated with the optimal service route to be displayed on a user interface executed on a device of the service provider.

12. The method in claim 11, wherein the one or more weighted factors comprise one or more of:

a respective priority of each of the one or more work orders;

a respective value of each of the one or more work orders; or a respective age of each of the one or more work orders.

13. The method in claim 11, wherein:

(a) determining the one or more work orders for the service provider further comprises determining, in real-time, the one or more work orders for the service provider based at least in part on one or more constraints; or (b) determining the optimal service route for the one or more work orders further comprises determining, in real-time, one or more feasible service routes for the one or more work orders based at least in part on the one or more constraints; and the one or more feasible service routes comprise the optimal service route.

14. The method in claim 13, wherein:

the one or more constraints comprise one or more of:

a work shift constraint for the work schedule of the service provider;

a total travel time limit for the optimal service route;

a maximum count of the one or more work orders of the service provider; or none of the one or more work orders of the service provider is assigned to another service provider.

15. The method in claim 13, wherein:

determining the optimal service route for the one or more work orders further comprises determining, in real-time, a respective score for each of the one or more feasible service routes based on the mathematical formula.

16. The method in claim 11, wherein:

the historical output data comprise a respective historical check-in time and a respective historical check-out time for each of the one or more fulfilled work orders; and the historical input data further comprise a respective skill level of a respective performing service provider for each of the one or more fulfilled work orders.

17. The method in claim 11 further comprising:

re-determining the one or more work orders or the optimal service route for the service provider upon receiving, via the computer network, an indication of a triggering event.

18. The method in claim 17, wherein:

the triggering event comprises one or more of:

a new unprocessed work order being added to the database;

a change in the work schedule of the service provider; or an update in the one or more work orders.

19. The method in claim 11 further comprising:
determining a performance of the service provider based at least in part on one or more of:
- a processing duration deviation for each of one or more past work orders fulfilled by the service provider;
- a timeliness indication for each of the one or more past work orders;
- a check-in count for each of the one or more past work orders; or
- a customer review for each of the one or more past work orders; and transmitting, via the computer network, a performance monitoring user interface for tracking the performance of the service provider to be displayed on a remote user device.

20. The method in claim 11 further comprising:
receiving, via the computer network, a status update for a processed work order of the one or more work orders from the user interface executed on the device of the service provider; and
updating, in real-time, the processed work order stored in the database based on the status update.

* * * * *